United States Patent Office 2,940,496
Patented June 14, 1960

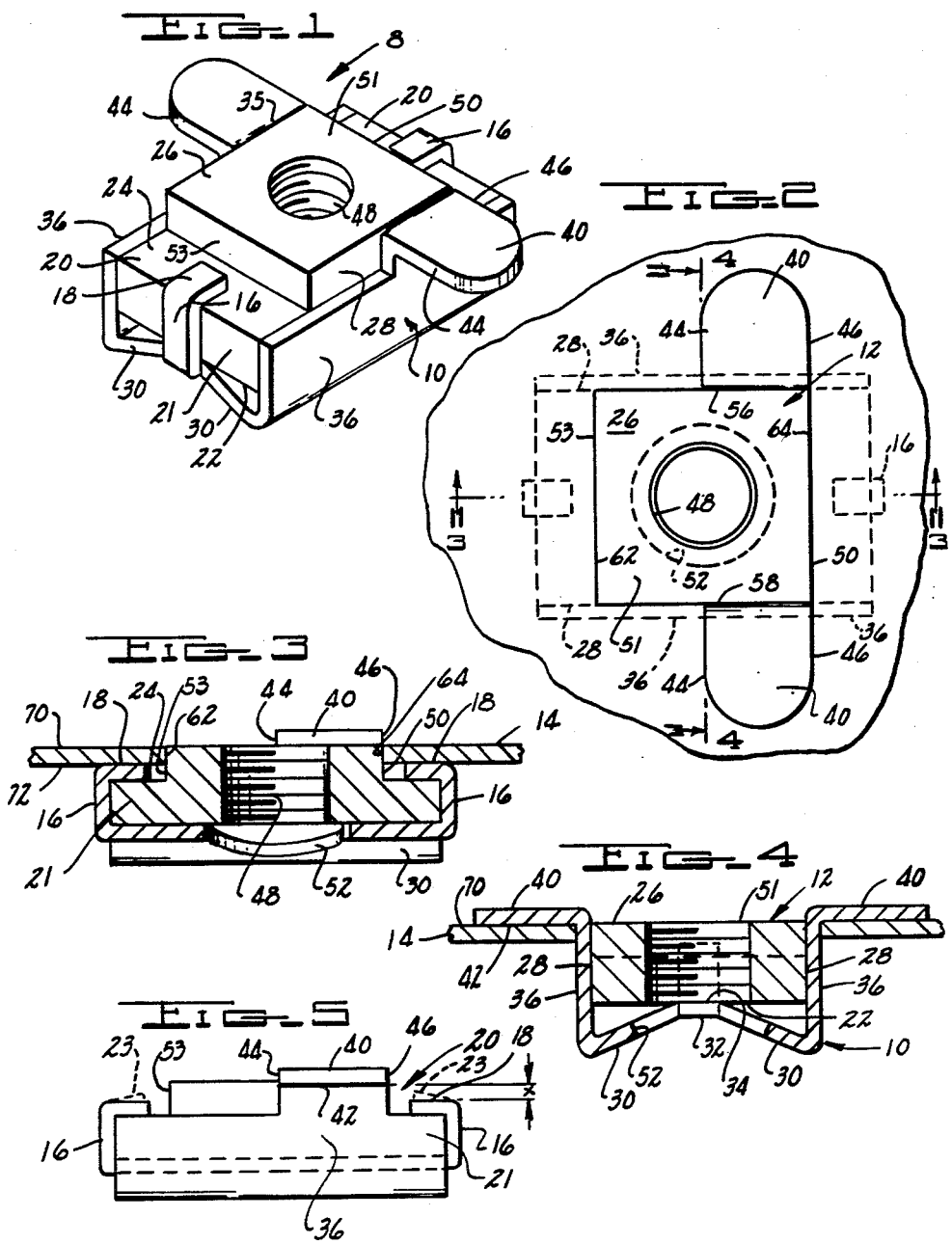

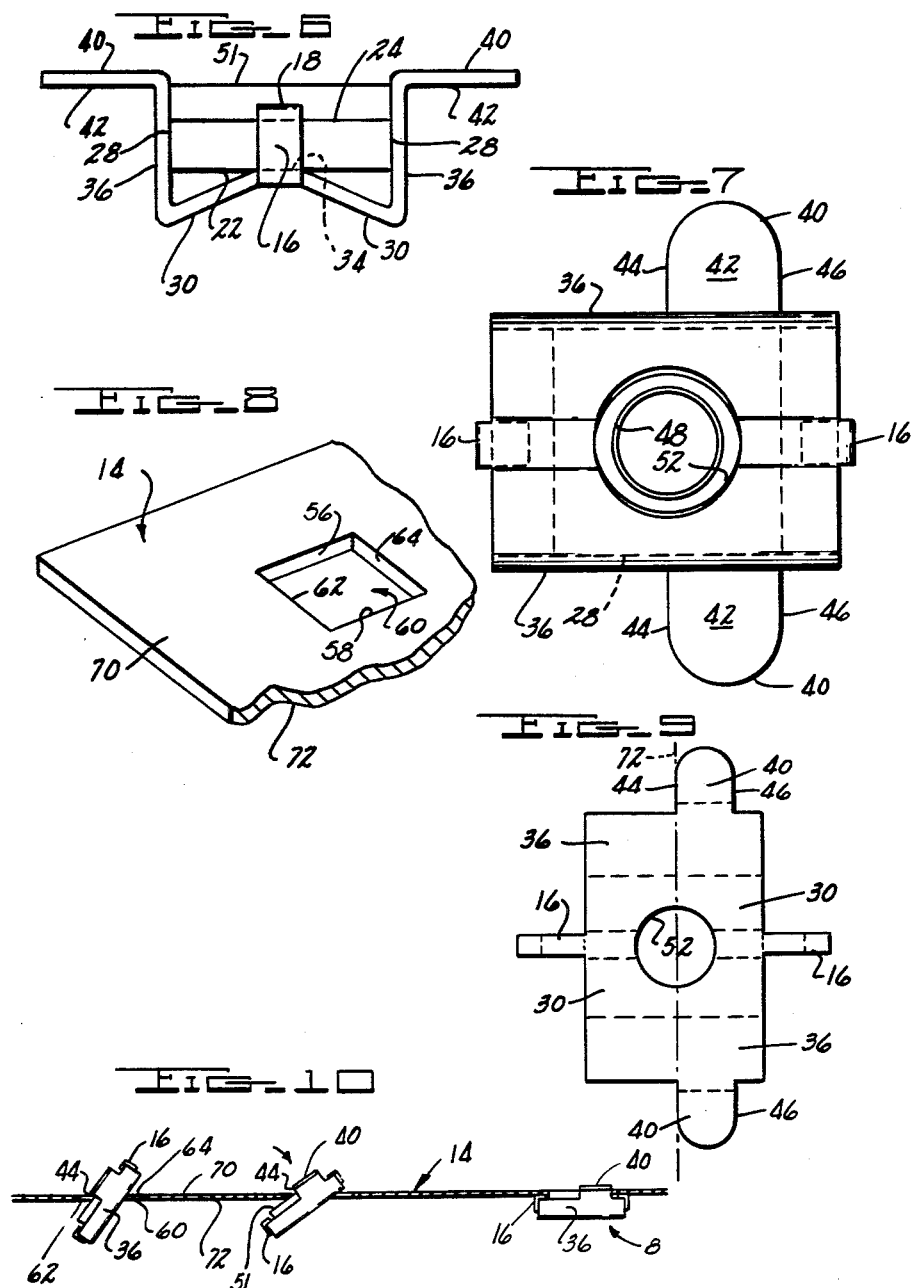

2,940,496

RESILIENT NUT CAGE TO COMPENSATE FOR VARYING PANEL THICKNESSES

Alexander S. Patten, Detroit, Mich., assignor to Multifastener Corp., Redford, Mich.

Filed Aug. 16, 1957, Ser. No. 678,660

3 Claims. (Cl. 151—41.75)

The present invention relates to new and useful improvements in fasteners and more particularly to a resiliently mounted cage-type fastening device.

Over a period of years, many fastener designs have been developed and used by the automotive and allied industries in very large quantities. Most of these fastening devices have been designed and developed for a particular application or installation where other standard type fasteners do not function satisfactorily. The present invention has been designed and developed primarily for use in the automotive industry, although it may have a usage in other fields. The present fastener will increase production and eliminate the necessity of the production worker climbing in and out of each vehicle moving down the assembly line. This practice is not only inefficient and time-consuming, but also extremely hazardous and fatiguing to the worker.

A primary object of the present invention is the provision of a simple cage-type fastening means which is inexpensive to manufacture, simple and durable in construction, light in weight, and which can be installed on a panel member with a minimum of time and effort.

Another object of the present invention is the provision of a resiliently mounted cage-type fastener which can be installed in a single blind opening on a panel member which is accessible from one side only, without danger of said fastener being dropped through the opening in which it is installed.

Still another object is the provision of a standard opening into which will fit a conventional clinch nut or a front mounting clip of the present invention.

A further object of the present invention is the provision of a cage-type fastener made of resilient material and formed in such a manner as to have pivotal horizontal locating and positioning ears which extend laterally and at substantially right angles from the longitudinal upper edge of the resilient cage.

Another object of the present invention is the provision of a pivotally mounted cage-type fastener mountable in a single panel opening of the same width as the fastener assembly, the length of the opening being of less dimension than the overall length of the fastener.

Still another object of the present invention is the provision of a generally flush mounting, resilient cage-type fastener which has an exceptionally high torque factor when installed or affixed to a single blind opening in a panel member.

The foregoing objects can be accomplished by the provision of a cage-type fastener having a cage made of resilient material; an inverted apertured T nut contained within the cage; the apertured nut being held within the cage by centrally located fingers which extend from the central bottom portion of the cage and wrap around and engage the apertured nut at both ends; a pair of downwardly divergent resilient walls extending laterally from the bottom central section of the cage to a point below the longitudinal sides of the apertured nut, the downwardly divergent resilient walls being bent upward at a point directly below the longitudinal sides of the apertured nut to form parallel sidewalls of said cage and restrain the apertured nut from sidewise movement; a pair of ears, one formed integral with each sidewall and at right angles thereto, the body portion of the ear members being located between the center line of the aperture in the nut and the rearmost edge thereof; and a panel member having a single blind opening accessible from one side only, the opening being of the same width as the cage nut assembly, and the length of the opening being less than the length of the fastener.

Other objects of this invention will appear in the following description and appended claims, reference being had to the accompanying drawings forming a part of this specification wherein like reference characters designate corresponding parts in the several views.

In the drawings:

Fig. 1 is a perspective view of a resiliently mounted cage nut assembly embodying the present invention.

Fig. 2 is a top plan view of the present invention mounted in a panel member.

Fig. 3 is a sectional view taken on lines 3—3 of Fig. 2.

Fig. 4 is a sectional view taken on lines 4—4 of Fig. 2.

Fig. 5 is a side elevational view of the fastener of the present invention.

Fig. 6 is an end elevational view of the fastener of the present invention shown in Fig. 5.

Fig. 7 is a bottom view of the fastener shown in Fig. 5.

Fig. 8 is a perspective view of a panel member opening with the part removed.

Fig. 9 is a top plan view of the resilient cage in the flat.

Fig. 10 illustrates the pivotal method of installing the cage nut in a panel member.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, Fig. 1 illustrates a perspective view of an unmounted resilient cage-type fastener embodying the present invention. The resilient sheet metal cage 10 has contained therein an inverted apertured T nut 12 having a shank portion 51. The nut 12 is positioned within the cage 10 by fingers 16 which extend from the central bottom portion of the cage. The fingers 16 are bent to wrap around both ends of the flanged portions 21 of the nut body 12. The flanged portions 21 extend in opposite directions from the shank portion 51 and have a flat top surface 24 which is parallel to the bottom surface 22 of the nut body. Extending downwardly from the central longitudinal bottom portion of the cage 10 are two divergent resilient walls 30 which are bent upward at a point directly below the longitudinal sides 28 of the nut 12. The upwardly bent portions form sidewalls 36 which are in contact with and parallel to the longitudinal sides 28 of the nut. On the top edge of each sidewall 36 and at substantially right angles thereto are located ear members 40 which are in the same horizontal plane as the top surface 26 of the nut 12. The forward edge 44 of each ear 40 is located on the center line of the aperture 48 perpendicular to the longitudinal sides of the nut 12 and form the pivot on which the entire cage nut assembly 8 swings when mounted in a panel member 14. The rear edge 46 of each ear member 40 terminates on a line parallel to the rearmost edge 50 of the shank portion 51.

Thus, with the apertured nut 12 resiliently mounted in cage 10, the entire assembly can be installed in a single blind opening 60 which is accessible from one side only, as illustrated in Figs. 2 and 10 of the drawings.

Fig. 2 of the drawings shows a top plan of the resiliently mounted cage-type fastener assembly embodying the present invention affixed to a panel member 14. The single opening 60 in the panel 14 has horizontal parallel edges 56 and 58 which are spaced apart the width of the fastener assembly. Surfaces 56 and 58 engage the longitudinal sidewalls of cage 10, while the vertical edges 62 and 64 engage the corresponding edges of the shank portion 51. The flanged portion 21 of the nut body 12 underlies the opening 60 in the panel member 14 at both ends when positioned, thus allowing the upper surface 18 of fingers 16 to frictionally engage the bottom surface 72 of panel member 14 (Fig. 3).

Figs. 3 and 4 are cross sectional views taken on lines 3—3 and 4—4 of Fig. 2 and illustrate the configuration of the inverted T nut member 12 as well as the resilient cage member 10. The nut body 12 is cut away at both ends and has surfaces 50 and 53 which are prependicular to the top surface 26. The surface 24 of the undercut portion 20 is perpendicular to the edges 53 and 50 and parallel with the base 22. The undercut portion 20 has disposed on surface 24, inwardly folded finger members 16 which wrap around the flanged ends 21 of the nut body 12 and prevent endwise movement thereof.

It will also be noted that the central portion of the bottom 34 of cage 10 is in engagement with and parallel to the central portion of the bottom surface 22 of nut 12. However, the bottom 34 of the central portion of the cage 10 extends laterally downward at divergent angles to form resilient wall members 30. The resilient divergent walls 30 extend downwardly and outwardly to a point below the longitudinal sidewalls 28 of the nut 12 and are bent upward to form sidewalls 36 parallel to the longitudinal sides 28 of nut 10. The underside 72 of the panel member 14 engages the upper surface 18 of the fingers 16 (Fig. 3) while the top side 70 of the panel member 14 engages the lower surface 42 of the ear members 40 (Fig. 4). Thus, a resilient or adjustable relationship exists between the upper surface of the fingers 16 and the lower surface 42 of the ear members 40, which by action of the resilient walls 30 permits the sidewalls 36 of the cage 10 to move a sufficient amount to receive and frictionally engage therebetween a panel member 14, which may be of varying thicknesses. Should fingers 16 be deformed in the manner illustrated in phantom at 23 in Fig. 5, additional frictional force could be applied to the bottom 72 of the panel member 14 since the cage 10 is made of resilient material.

The resilient or adjustable relationship is best illustrated in Figs. 5 and 6 of the drawings, which show an unmounted cage nut assembly having a distance "X," representing the panel thickness, between the upper surface 18 of the finger 16 and the lower surface 42 of the ear member 40.

A bottom plan view of the cage nut assembly is illustrated in Fig. 7, wherein the cage 10 has a centrally located aperature 52 therein which is concentric with the threaded aperature 48 in nut 12. Fingers 16 extend from both ends of cage 10 and hold nut 12 in position within the cage.

The generally square opening 60 in panel member 14, shown in Fig. 8, permits the fastener assembly to be installed with the longitudinal dimension of the nut 12 in either direction. However, if the recess or cut away portion 20 were made smaller so as to increase the area of top surface 26, thus reducing the surface area 24 on flanged portion 21, the opening 60 would then be rectangular in shape and the cage nut assembly 12 would necessarily be installed parallel with the longest side of the opening. This construction would thereby control the direction in which the fastener was positioned in a sheet or panel.

Fig. 9 represents a top plan of the sheet metal cage 10 in the flat before forming. An aperture 52 is located in the central portion thereof for mechanical reasons. The relationship of the aperture 52 to the ear members 40 is readily appreciated, since the center line 78 of aperture 52 lies on the same line as the pivot edge 44 of the ear member 40. The finger members 16 extend from and are integral with the main body portion of the cage and are deformed along the dotted lines.

The method used for fastener installation is disclosed in Fig. 10 and illustrates first, the entrance of the cage nut assembly into opening 60; second, the pivotal action of ear members 40; and last, the final positioning of the fastener assembly in the panel member 14. The complete cage nut assembly 8 is first inserted into opening 60 until the forward edge 44 of the ear member 40 engages the upper surface 70 of the panel member 14. Next the cage nut assembly is moved forward until the body of nut 12 engages edge surface 62 of opening 60. At this time, the cage nut assembly 8 is rotated or pivoted downwardly causing the ear members 40 to flex the resilient walls 30 of the cage until the rearmost edge of the assembly clears surface 64 of opening 60. At this time, the cage nut assembly is moved rearwardly until the forward edge 53 of the undercut portion 20 snaps upward into position, engaging surface 62 in the panel opening 60. The cage nut assembly 8 is then resiliently mounted within the panel member 14 and in frictional engagement therewith.

Having thus described my invention, I claim:

1. In a front mounting cage type fastener assembly, the combination of a resilient cage; a threaded fastener in said cage, said fastener including a rectangular body portion which is stepped on each end to provide a rectangular shank of less length than said body portion; the central longitudinal portion of said cage in contact with the underside of said fastener; a pair of centrally located, inwardly bent fingers, one extending from each end of said cage to engage and overlie the stepped sections of said fastener body portion; a pair of downwardly divergent resilient flexing walls extending laterally from the bottom of said central longitudinal portion of the cage and bent upwardly to form longitudinal sidewalls engaging the sides of said fastener body portion; a pair of relatively narrow ears, one extending upwardly and outwardly from each of said cage sidewalls at the top thereof at one side of the centerline of the sidewalls; said fastener assembly being attachable to a panel having an opening therein, from one side of the panel, by tilting the end of the cage furthest from the ears through the opening until the ears engage the front of the panel, moving the cage against the resistance of the ears to deform the flexing walls and then aligning the fastener shank into the panel opening while moving the overlying fingers into engagement with the back of the panel; the fastener assembly being maintained in position under tension by cooperation of said ears and flexing walls; the shank of the fastener lying directly adjacent two sides of the opening, and closely adjacent the other two sides of the opening, with portions of the cage ears therebetween, to prevent rotation of the fastener body portion.

2. A front mounting cage type fastener as claimed in claim 1, wherein each of said ears is located between the centerline of the fastener and one edge of the said fastener shank.

3. In a generally flush front mounting cage type fastener assembly, the combination of a resilient cage; a threaded fastener in said cage, said fastener including a rectangular body portion which is stepped on each end to provide a rectangular shank of less length than said body portion; the central longitudinal portion of said cage in contact with the underside of said fastener; a pair of centrally located, inwardly bent fingers, one extending from each end of said cage to engage and overlie the stepped sections of said fastener body portion; a pair of downwardly divergent resilient flexing walls extending laterally from the bottom of said central longitudinal portion of the cage and bent upwardly to form longitudinal sidewalls engaging the sides of said fastener body portion; a pair of relatively narrow ears, one extending upwardly and outwardly from each of said cage sidewalls at the top thereof at one side of the centerline of the sidewalls; said fastener assembly being attachable to a panel having an opening therein, from one side of the panel, by tilting the end of the cage furthest from the ears through the opening until the ears engage the front of the panel, moving the cage against the resistance of the ears to deform the flexing walls and then aligning the fastener shank into the panel opening while moving the overlying fingers into engagement with the back of the panel, the face of the fastener shank lying substantially flush with the front of the panel; the fastener assembly being maintained in position under tension by cooperation of said ears and flexing walls; the shank of the fastener lying directly adjacent two sides of the opening, and closely adjacent the other two sides of the opening, with portions of the cage ears therebetween.

References Cited in the file of this patent

UNITED STATES PATENTS

| | | |
|---|---|---|
| 2,067,587 | Zweibel | Jan. 12, 1937 |
| 2,363,006 | Klaus | Nov. 21, 1944 |
| 2,745,458 | Bedford | May 15, 1956 |
| 2,804,180 | Richardson | Aug. 27, 1957 |